Jan. 6, 1931.  H. C. HAYES  1,787,536
METHOD AND APPARATUS FOR DETERMINING GRAVITY VARIATIONS
Filed Nov. 21, 1928   2 Sheets-Sheet 1

Inventor
Harvey C. Hayes
By Attorney
Harold Dodd

Jan. 6, 1931.   H. C. HAYES   1,787,536
METHOD AND APPARATUS FOR DETERMINING GRAVITY VARIATIONS
Filed Nov. 21, 1928   2 Sheets-Sheet 2

Inventor
Harvey C. Hayes
By Attorney

Patented Jan. 6, 1931

1,787,536

UNITED STATES PATENT OFFICE

HARVEY C. HAYES, OF WASHINGTON, DISTRICT OF COLUMBIA

METHOD AND APPARATUS FOR DETERMINING GRAVITY VARIATIONS

Application filed November 21, 1928. Serial No. 321,012.

(GRANTED UNDER THE ACT OF MARCH 3, 1883, AS AMENDED APRIL 30, 1928; 370 O. G. 757)

This invention relates primarily to systems employed for determining small differences in the force of gravity in its variations from point to point over the earth's surface. It has particular reference to the determination of the variations in the gravity constant, usually designated by the symbol $g$, in its relation to geophysical exploration work.

It has been recognized for some time that the force of gravity, or the value of $g$, varies somewhat from place to place, even over a relatively small area, in accordance with the differences in the structure of the earth's crust. For example, a formation of relatively dense structure, either protruding from the earth or entirely hidden below the earth's surface, will bring about an increase in the value of $g$, while intrusion of a relatively light mass at a particular point below the earth's surface will tend to decrease the value of $g$ at that point. This fact has been relied upon as an aid to the location of hidden deposits of various kinds and methods based upon it are particularly well suited to regions where definite variations of the value of $g$ may be taken to indicate with fair certainity a particular formation. For example, in the Gulf Coast region, it has been discovered that certain variations in the value of $g$ from the normal value to be expected at the particular locality have been found to constitute a reliable indication of the presence of a salt dome. This in turn is indicative of a structure suitable for the accumulation of oil.

Various methods have been suggested in the past for determining the value of $g$ or its relative value over large areas. One form of device commonly employed for this purpose is known as the torsion balance, which has been found to re-act in a definite way to gravity differences. Difficulty has been experienced in the past, however, in adapting the gravity-determining instruments to extensive exploration work due to the great care and precision required in setting up the apparatus, the length of time required for obtaining the appropriate readings, the cost of the apparatus, its weight, which renders it difficult to transport into relatively inaccessible locations, and the slowness of the processes in general. By the present invention a new and improved method is contemplated which overcomes to a large extent the objectionable features of the previously known methods and apparatus. Broadly stated, the invention contemplates the use of a plurality of simple pendulums adapted to be set up at a series of points over an area to be explored and adapted to be simultaneously operated, with provisions for forming a common photographic record of the number of oscillations of all of the pendulums. Various objects and advantages will become apparent from the detailed description of the invention, which will now be given with reference to the accompanying drawings forming a part hereof and in which—

Before entering into a detailed description of one suitable embodiment of the invention, attention is called to the fundamental equation on which the present invention, as well as many of the prior known devices of this character, depends. This is the relation $$t = 2\pi\sqrt{\frac{L}{g}}.$$

Where $t$ represents the period of oscillation of a pendulum, L represents the length of the pendulum and $g$ represents the gravity constant. From this it is apparent that $$g = \frac{4\pi^2 L}{t^2}$$

of which the numerator becomes a constant for any particular pendulum and may readily be determined, if desired, by operating the pendulum where the value of $g$ is known. If this quantity, $4\pi^2 L$ is designated $k$, the value of $g$ becomes $$g = \frac{k}{t^2}$$

Now, the value of $t$ may be determined by noting the number of swings N of the pendulum during a definite period of time T, i. e., $$t = \frac{T}{N}.$$

If several pendulums are set up at different points where the values of $g$ may differ and these are set into operation for a definite time interval T, which is the same for all of the pendulums, we may form the following expressions:

$$g_1 = \frac{k_1}{t_1^2} = \frac{k_1 N_1^2}{T^2}$$

and $$g_2 = \frac{k_2}{t_2^2} = \frac{k_2 N_2^2}{T^2}.$$

in which the subscrips serve to indicate the various points at which the pendulums are set up. From the above we obtain the ratio:

$$\frac{g_1}{g_2} = \frac{k_1 t_2^2}{k_2 t_1^2} = \frac{k_1 N_1^2}{k_2 N_2^2} = K \frac{N_1^2}{N_2^2}$$

where K is a constant depending upon the values of $k_1$ and $k_2$. In other words, the values of gravity at two different points will be directly proportional to the squares of the number of swings of pendulums stationed at those points during the same time interval. It will thus be apparent that to determine variations in the value of $g$ from place to place, all that is required is to determine the number of swings of a pendulum at each of the points during a given time interval, or of a series of pendulums simultaneously operated at all of the points during the same period. Where a plurality of pendulums are employed, it will, of course, be necessary to first mutually calibrate them by setting the pendulums into operation at one station to determine the relative values of the constants $k$. Should it be desired to determine the absolute value of $g$ at any particular point, it will only be necessary to determine the definite value of the constant $k$ for any of the pendulums by first operating it at a point where the value of $g$ is known. However, for the purposes of the present invention it is not necessary to determine the absolute values of $g$ from point to point but merely their relative values which, as indicated above, are dependent upon the relative values of N.

Figure 1:
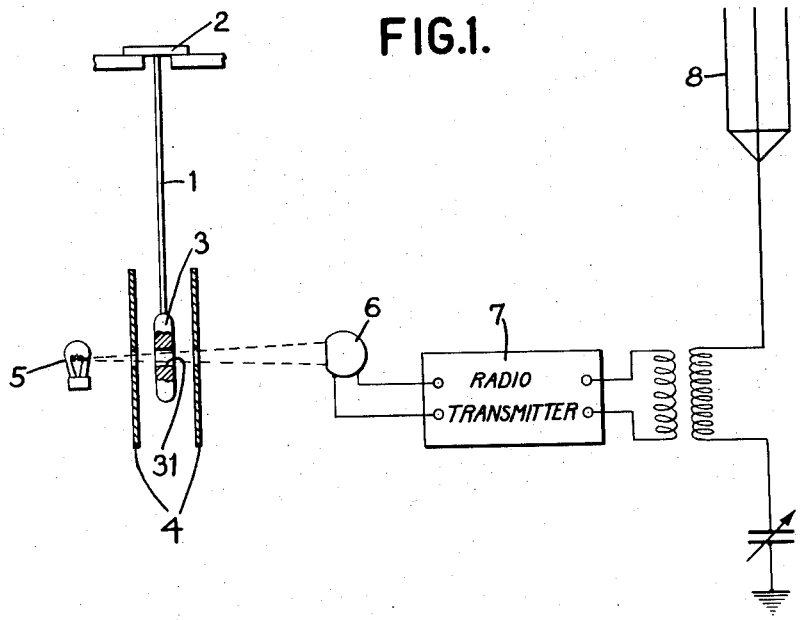
Figure 1 represents schematically the apparatus employed at each of the pendulum stations.

Referring now to the drawings, and particularly Figure 1, it will be noted that a pendulum 1 is provided, suspended, preferably, by means of a knife-edge 2 from any suitable support. At its lower end, the pendulum is provided with a mass 3 of any suitable material having formed substantially through its center an opening 31. The pendulum when set in motion is adapted to swing between a pair of partitions 4, each of which is provided with a small aperture so that when the pendulum is at rest, these apertures, as well as the opening 31, will be aligned. In direct alignment with these openings, furthermore, there is provided a suitable source of light 5. Upon the opposite side of the pendulum, from the light source 5, there is provided any suitable form of light-sensitive cell 6, the terminals of which are connected to a radio transmitter 7 of ordinary construction. This transmitter is so arranged with relation to the other parts of the system as to emit radio signals through the antenna 8 in response to the impulses from the light-sensitive cell 6.

It will be apparent from the foregoing that when the pendulum 1 is set into oscillation, the opening 31 in the mass 3 thereof will be aligned with the apertures in the partitions 4 each time that the pendulum passes through its normal position of rest. At such times a beam of light from the source 5 will be permitted to strike the light-sensitive cell 6 so that a corresponding signal will be emitted by means of the antenna 8. The present invention contemplates an arrangement of this character at each of a plurality of stations set up at a number of points over the area to be explored.

Now, the radio impulses sent out by the antenna 8 are adapted to be picked up by an antenna 9 located at a recording station. These impulses are detected and amplified by the radio receiver 10 and are passed through a suitable transformer 11 to the string 12 of a recording galvanometer or oscillograph. It will be understood that the string 12 is mounted between the poles of a permanent or electro-magnet 13 so that upon the receipt of impulses from the radio receiver 10, the string will be vibrated.

Figure 2:
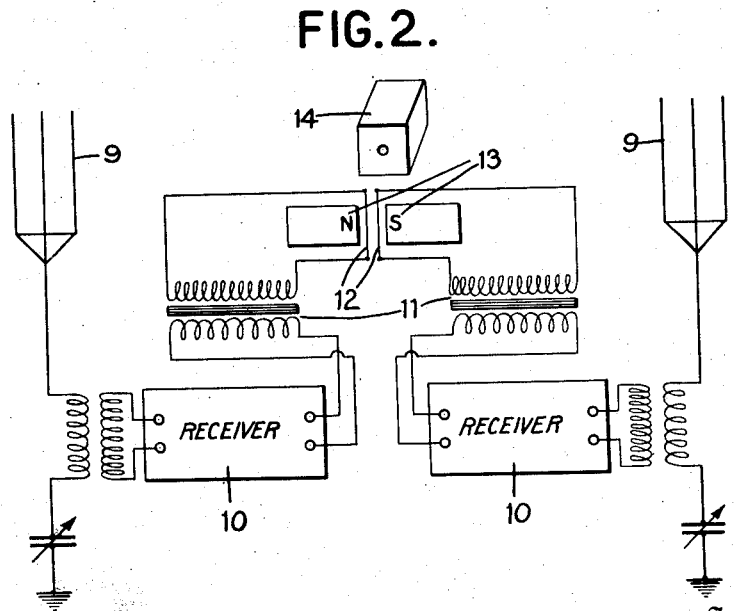
Figure 2 represents schematically the apparatus located at the recording point for producing a common record of the swings of all of the pendulums.

For each of the pendulum stations provided with apparatus as illustrated in Figure 1, there will be a separate radio receiving apparatus such as illustrated in Figure 2. Each transmitter will be adjusted to send out a signal of a definite wave length differing from the wave length of the other transmitters and, correspondingly, each of the receivers 10 will be tuned for the reception of a particular one of the wave lengths sent out by the transmitters 7. Preferably, all of the strings 12 associated with the plurality of radio receivers will be mounted in the same magnetic field so as to constitute a single multi-string galvanometer or oscillograph, although this is not essential. A plurality of separate single-string instruments might be employed, if desired, so that an individual record for each pendulum would be formed. Any suitable form of indicator or recording apparatus may be provided for the purpose of indicating the vibrations of the several strings 12. Preferably, this will assume the form of a camera 14 which is provided with suitable means for moving a photographic record strip at a uniform rate past the exposure opening which is appropriately focused upon the strings 12. A beam of light directed from any suitable source toward the strings may either be reflected onto the strip by mirrors carried by the strings, or may have shadows cast by the strings across the moving strip. There will thus be produced photographically the oscillatory movements of those portions of the strings which are in the path of the light-beam and these movements will correspond to the impulses set up by the pendulums.

Figure 3:
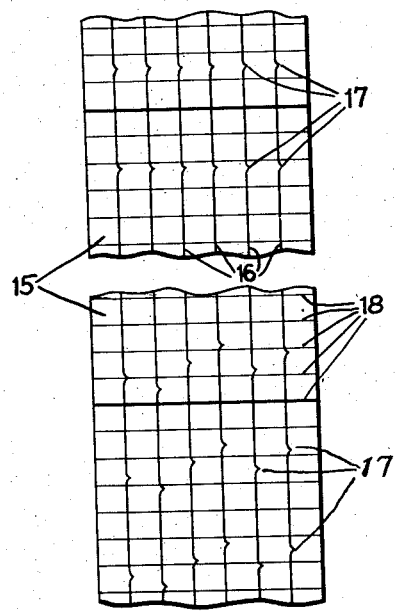
Figure 3 illustrates several sections of a record produced at the recording station of the oscillations of all of the pendulums.

In Figure 3 there are illustrated portions of a record strip 15 showing a record, such as might be produced, of the vibrations of a series of six strings controlled by six pendulums located at different points over an area being explored. The lines 16 indicate the condition of the several strings as the record strip is advanced. The sudden breaks 17 in these lines indicate the points at which the strings are disturbed as a result of the radio impulses sent out under control of the various pendulums. In the upper section of the strip indicated in this figure, the beginning of a series of the swings of the pendulums may be noted and it will be observed that at this time all of them are substantially in synchronism. While it is not essential that all of the pendulums should be started up simultaneously, it is deemed preferable to do so and special means for accomplishing this will presently be described. In the lower section of Figure 3, the condition of the pendulums after a considerable period of time is illustrated and it will be observed that the breaks 17 occur in this figure at widely different points. Since the record strip will have been fed at a known uniform rate, the period of time elapsing between any two selected points of the record may readily be determined by direct measurement. If desired, suitable means may be provided for forming a continuous series of time-lines 18 across the record as the strip is advanced, or such lines may be produced on the strip prior to or after the forming of the record lines 16. These time-lines may suitably be applied at intervals of one-tenth of a second. Now, by counting the number of breaks 17 in each of the photographic lines 16 between two definite points on the record strip, and by comparing the squares of these numbers, the ratio of the values of $g$ at the various points will be given. One of the pendulums, whose oscillations will be represented by the lines 16, should preferably be located at a point where the value of $g$ is known so that this may be adopted as the standard against which the results may be compared. If only the relative values of $g$, and not their actual values, are sought, then by starting all of the pendulums at the same instant, some indication of these relative values will be given by a comparison of the position of the breaks 16 in the lines 17 on the common record strip after a predetermined length of operation of the pendulums.

Figure 4:
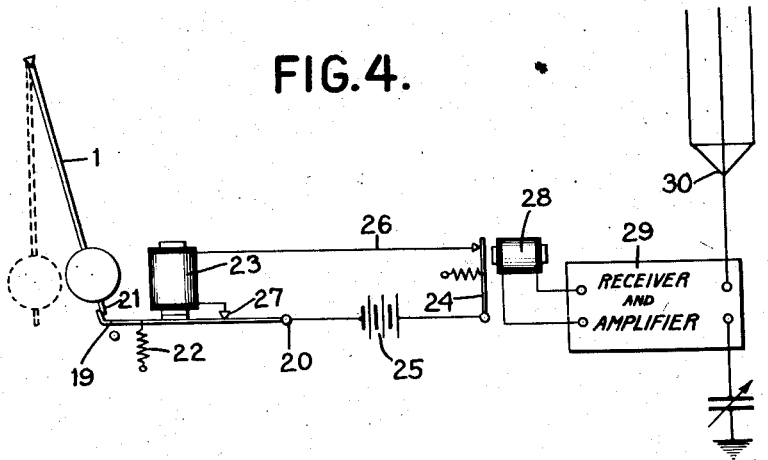
Figure 4 illustrates schematically apparatus which may be employed at each pendulum station for starting all of the pendulums into oscillation simultaneously.

For the purpose of starting up all of the pendulums simultaneously, an arrangement such as shown in Figure 4 may be employed. As here indicated, a hook 19 pivoted at 20 may be adapted to co-operate with an extension 21, or other suitable portion of the pendulum 1. The relation of these parts should be such that the hook is adapted to maintain the pendulum in its extreme, shifted position at the height of the arc through which it is intended to swing. A spring 22 may normally tend to draw the hook downwardly to release the pendulum but this action will at times be opposed by the greater force of an electro-magnet 23 which may be suitably energized and subject to de-energization; for example, this magnet may be placed in circuit through an arm 24 with a source of electricity 25. The circuit through the magnet is preferably so arranged that it may be broken at a point of contact beween a branch 26 of the circuit and the arm 24 and at a point between a contact 27 and the arm 19. In preparing the device for operation, the pendulum will be swung to the full line position indicated in Figure 4 and the hook 19 will be raised against the tension of spring 22, so that the arm completes the circuit through the magnet 23 insofar as the contact point 27 is concerned. The arm 24 at the same time is spring-urged in the proper direction to fully complete the circuit. In this way the magnet 23 becomes energized so that it will retain the hook 19 in its elevated position. Now, an electro-magnet 28 connected to the output terminals of a radio-receiving and amplifying unit 29 is placed in co-operative relation to the arm 24. The unit 29 is such that radio impulses received through an antenna 30 will be amplified to a sufficient extent to cause the magnet 28 to draw the arm 24 against the action of the spring. When it is so drawn, the contact between it and the branch 26 of the circuit through the magnet 23 will be broken and the magnet will become de-energized. This will permit the spring 22 to withdraw the hook 19 and will serve to release the pendulum for operation over any desired period. It will be clear that by the provision of the system illustrated in Figure 4 at each of the pendulum stations, and the provision of a suitable radio transmitter at the central or recording station, all of the pendulums may be started off at the same time by the mere sending of a radio signal.

While one admirable form of the improved method has been explained above, and a suitable form of apparatus for carrying out this method has been schematically illustrated, it will be understood that various modifications in the method and apparatus may be made without departing from the scope of the present invention. It is desired to be limited in this respect only by the scope of the claims which follow.

The invention described herein may be manufactured and used by or for the Government for governmental purposes without the payment to me of any royalty thereon.

What I claim is:

1. In apparatus of the class described a plurality of pendulums located at widely separated points, means associated with each pendulum for transmitting a radio signal upon each swing of the pendulum, all of said transmitting means being adjusted for different wave lengths, a plurality of radio receiving outfits located in proximity to each other and each tuned to one of said transmitting means, and a recording oscillograph adapted to designate on a single record strip the oscillations of each of said pendulums.

2. In apparatus of the class described a plurality of pendulums located at different points, a radio transmitter at one of said points and adapted to be controlled by one of said pendulums in accordance with the swings of the latter, and means including a radio receiver for recording at a single point the number of swings of each pendulum.

3. In apparatus of the class described a plurality of pendulums located at different points and means for recording on a common record strip the number of swings of each pendulum.

4. In apparatus of the class described a plurality of pendulums located at different points, a radio transmitter at one of said points and adapted to be controlled by one of said pendulums in accordance with the swings of the latter and means including a radio receiver for recording on a common record strip the number of swings of each pendulum.

5. In apparatus of the class described a plurality of pendulums located at different points, a radio transmitter associated with each of said pendulums and adapted to transmit signals in accordance with the oscillations of said pendulums, and means including radio receivers located at a single point for indicating the oscillations of said pendulums.

6. In apparatus of the class described a plurality of pendulums located at different points, a radio transmitter associated with each of said pendulums and adapted to transmit signals in accordance with the oscillations of said pendulums and means including radio receivers located at a single point for recording on a common record strip the oscillations of said pendulums.

7. A method of determining variations in gravity over the earth's surface which comprises operating a series of pendulums at a plurality of different points, transmitting signals from each of said points to a common point in accordance with the oscillations of said pendulums, and producing at said common point a record of the oscillations of all of said pendulums for the purpose of comparing their frequencies.

8. A method of determining variations in gravity over the earth's surface which comprises operating a series of pendulums at a plurality of different points, transmitting signals from each of said points to a common point in accordance with the oscillations of said pendulums, and producing at said common point an indication of the oscillations of all of said pendulums for the purpose of comparing their frequencies.

9. A method of determining variations in the force of gravity at a plurality of points which comprises operating a plurality of mutually calibrated, simple pendulums at said points and producing a common record of the oscillations of said pendulums for purposes of direct comparison.

10. In apparatus of the class described a plurality of pendulums located at different points, a radio transmitter at one of said points and adapted to be controlled by one of said pendulums in accordance with the swings of the latter, means for simultaneously starting said pendulums into operation, and means including a radio receiver for recording at a single point the number of swings of each pendulum.

11. In apparatus of the class described a plurality of pendulums located at different points, means for simultaneously starting said pendulums into operation, a radio transmitter associated with each of said pendulums and adapted to transmit signals in accordance with the oscillations of said pendulums, and means including radio receivers located at a single point for indicating the oscillations of said pendulums.

12. In apparatus of the class described a plurality of mutually calibrated, simple pendulums located at different points, means for simultaneously starting all of said pendulums into oscillation, and means for recording at a single point the number of oscillations of each pendulum.

HARVEY C. HAYES.